(12) United States Patent
Williams

(10) Patent No.: US 6,349,339 B1
(45) Date of Patent: Feb. 19, 2002

(54) SYSTEM AND METHOD FOR UTILIZING DATA PACKETS

(75) Inventor: Henry R. Williams, Palisades Park, NJ (US)

(73) Assignee: ClickRadio, Inc., New York, NY (US)

(*) Notice: Subject to any disclaimer, the term of this patent is extended or adjusted under 35 U.S.C. 154(b) by 0 days.

(21) Appl. No.: 09/444,123

(22) Filed: Nov. 19, 1999

Related U.S. Application Data

(63) Continuation of application No. 09/034,773, filed on Mar. 2, 1998, now Pat. No. 6,108,686.

(51) Int. Cl.⁷ .............................................. G06F 15/16
(52) U.S. Cl. ...................... 709/229; 709/217; 709/219; 709/203
(58) Field of Search ................................ 709/201, 203, 709/217, 219, 229; 707/104, 10

(56) References Cited

U.S. PATENT DOCUMENTS

| | | | |
|---|---|---|---|
| 5,237,157 A | | 8/1993 | Kaplan |
| 5,541,919 A | | 7/1996 | Yong et al. |
| 5,675,734 A | | 10/1997 | Hair |
| 5,708,845 A | | 1/1998 | Wistendahl et al. |
| 5,864,682 A | * | 1/1999 | Porter et al. ................. 709/247 |
| 5,926,624 A | * | 7/1999 | Katz et al. ................... 709/217 |
| 5,956,716 A | * | 9/1999 | Kenner et al. ................. 707/10 |
| 5,960,411 A | | 9/1999 | Hartman et al. |
| 5,963,916 A | | 10/1999 | Kaplan |
| 5,966,440 A | | 10/1999 | Hair |
| 5,986,200 A | | 11/1999 | Curtain |
| 6,018,768 A | * | 1/2000 | Ullman et al. ............... 709/218 |
| 6,060,997 A | * | 5/2000 | Taubenheim et al. .. 340/825.44 |
| 6,093,880 A | * | 7/2000 | Arnalds ....................... 84/464 |
| 6,125,387 A | * | 9/2000 | Simonoff et al. ........... 709/218 |

\* cited by examiner

Primary Examiner—Mehmet B. Geckil
(74) Attorney, Agent, or Firm—Fay Kaplun & Marcin, LLP

(57) ABSTRACT

A system and method for utilizing (e.g., playing) data packets, e.g., audio, video, text, etc. are provided. A server arrangement of the system provides the data packets to a user computing arrangement of the system. A storage device of the user computing arrangement stores the data packets. The data packets are arranged in a predetermined order using the server arrangement and/or the user computing arrangement. The user computing arrangement executes a set of instructions to utilize the data packets in the predetermined order. A user of the user computing arrangement is prevented from modifying the predetermined order.

43 Claims, 8 Drawing Sheets

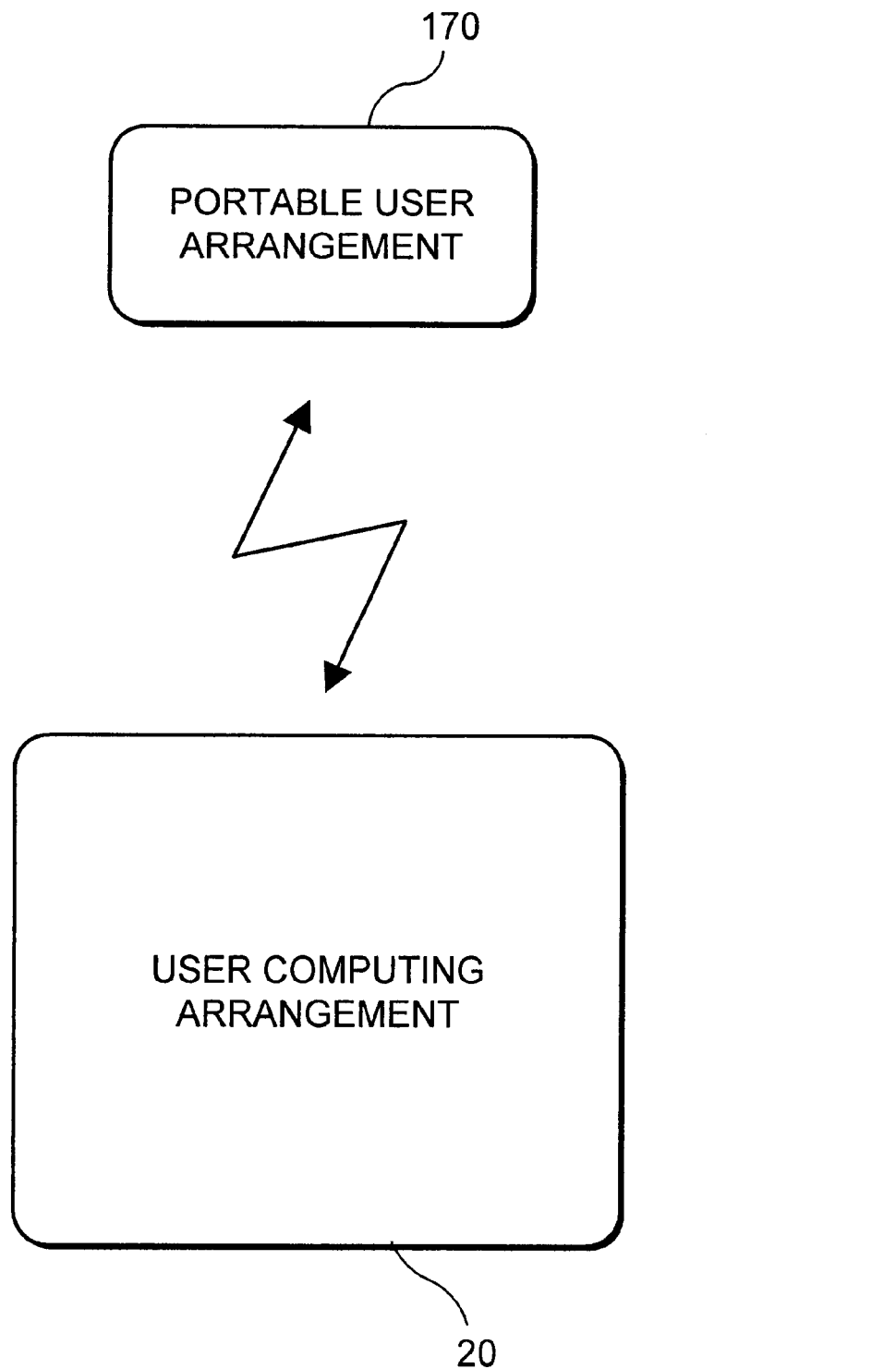
F I G. 4a

SYSTEM AND METHOD FOR UTILIZING DATA PACKETS

This application is a continuation of Ser. No. 09/034,773 filed Mar. 2, 1998 now U.S. Pat. No. 6,108,686.

INCORPORATION BY REFERENCE

U.S. patent application No. 09/03,4773, which was filed on Mar. 2, 1998 and entitled "Agent-Based On-line Information Retrieval and Viewing System," is incorporated hereby, in its entirety, by reference.

FIELD OF THE INVENTION

The present invention relates to a field of utilization of data packets which may include, e.g., audio, video, and other materials.

BACKGROUND INFORMATION

A system known as "Internet radio" has become more popular over the last few years. Internet radio allows a user to receive a streaming flow of audio content which the user listens to in real time. The way in which the user may store the content and the streaming flow depends on the Internet connection of the user. If the user has a bad connection, he or she will receive a low quality audio.

Another system is known as "Jukebox-only" system. Jukebox provides pitfalls in areas of legality and consumer experience. First, the user cannot be provided with a "music-on-demand" system without paying full royalties to song and song recording copyrights holders. Moreover, such rights may be granted on a voluntary basis, i.e., record companies may refuse to grant such rights. With regards to the user experience, while it may be beneficial for the user to be able to purchase digital music and to play it in any preferable manner, this level of control may not always be possible. For some users, selecting which record to play is more burdensome than is preferable. Thus, there is a need for a system which would allow to eliminate these and other disadvantages of the prior art.

SUMMARY OF THE INVENTION

The present invention relates to a system and method for utilizing (e.g., playing) data packets, e.g., audio, music, video, advertisement, informative materials. A server arrangement provides the data packets to a user computing arrangement. A storage device of the user computing arrangement stores the data packets. The data packets are arranged in a predetermined order using the server arrangement and/or the user computing arrangement. The user computing arrangement executes a set of instructions to utilize the data packets in the predetermined order. A user of the user computing arrangement is prevented from modifying the predetermined order.

BRIEF DESCRIPTION OF THE DRAWINGS

FIG. 4a shows the user computing arrangement communicating with a portable user arrangement.

DETAILED DESCRIPTION

The present invention generally relates to a system and method for providing a predetermined group of data packets to a user who may utilize (e.g., review, listen, watch, read, etc.) such data packets with a user computing arrangement ("UCA"). The data packets may be provided to the UCA from a server arrangement, via a communication network (e.g., the Internet) or via mail using a Removable Storage Device ("RSD"). When the data packets are transmitted via a communication network, the transmission may be continuous (e.g., without any interruptions as long as there is a connection between the server arrangement and the UCA) or periodic (e.g., the server arrangement provides the data packets to the UCA every two hours).

Each data packet may include a single element/item, such as a song, an advertisement, etc. The single element may be divided into a plurality of subpackets. For example, when the data packet is transmitted, each of the plurality of subpackets is transmitted separately from each other. When the subpackets are received by the UCA, they are "assembled" together into the data packet.

The data packets may be utilized by the user in a predefined manner. The user has only limited control over the order in which the data packets are utilized. For example, the user may skip a data packet (e.g., skip a single item) but cannot replay or rewind the data packet, nor may the user choose which data packet will be played next.

The data packets may contain particular materials, for example, information data (e.g., advertisements, etc.), entertainment information (e.g., video displays), educational information (e.g., textbooks). The present invention allows the user to review such data packets, e.g., as if the user was listening to or viewing a broadcast on the conventional radio or the television. The system and method of the present invention also enables the user to gain more control over the materials than in the use of conventional radio or television. By using the system and method of the present invention, the user may skip over, completely or partially, certain materials (e.g., by skipping corresponding subpackets) when he or she desires. The user may also instantaneously purchase the materials during or after reviewing the materials.

Figure 1:
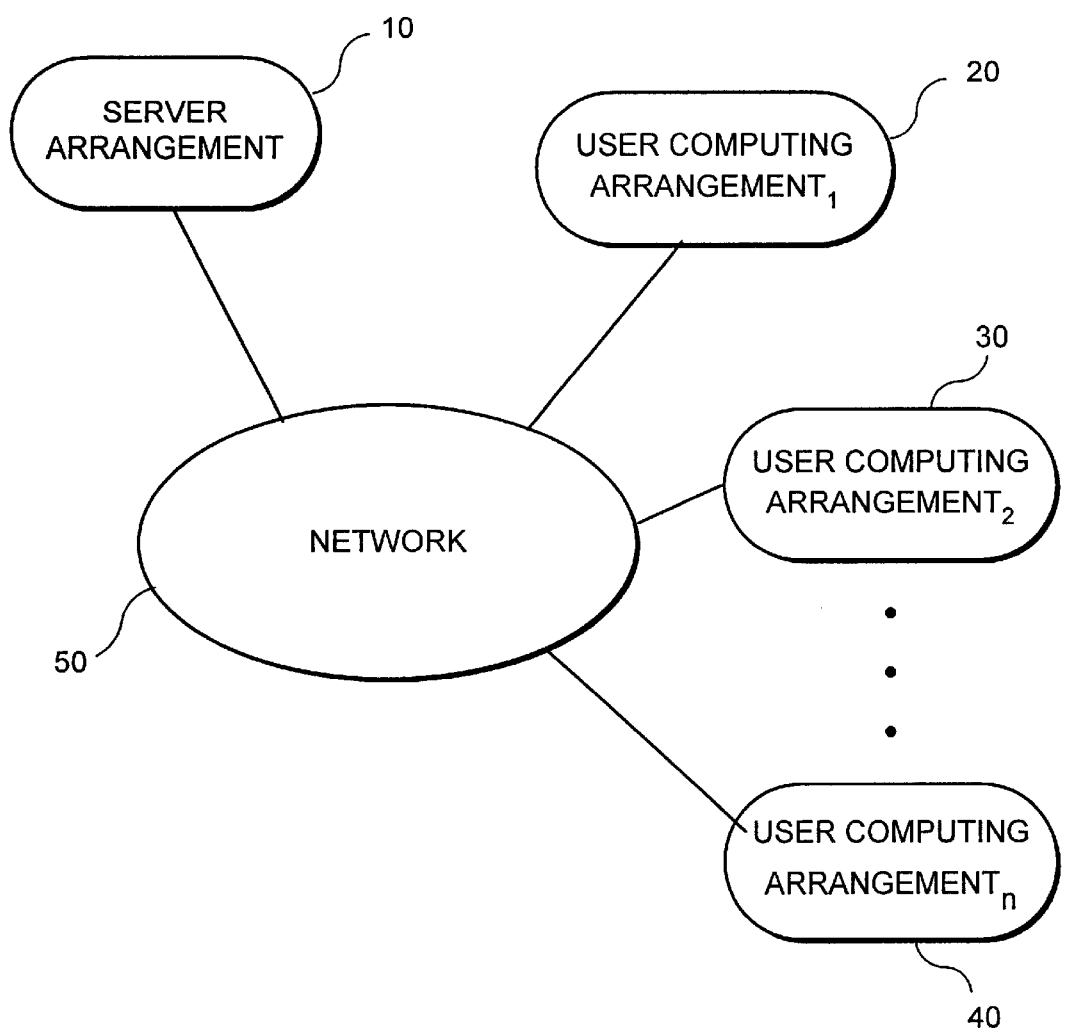
FIG. 1 shows an exemplary embodiment of a system according to the present invention.

FIG. 1 shows an exemplary embodiment of a system 1 according to the present invention. The system may include a server arrangement 10, a plurality of UCAs (e.g., UCA 20, UCA 30, UCA 40) and a communication network 50. The network 50 may be an arrangement of nodes and connecting branches for information exchange. The network 50 may also be the Internet, a local area network, a computer network, an intranet, a local area network, a wide area network, an Extranet, a virtual private network, a metropolitan area network, a wireless network, a satellite network or any description for an arrangement of nodes and connecting branches for information exchange.

Figure 2A:
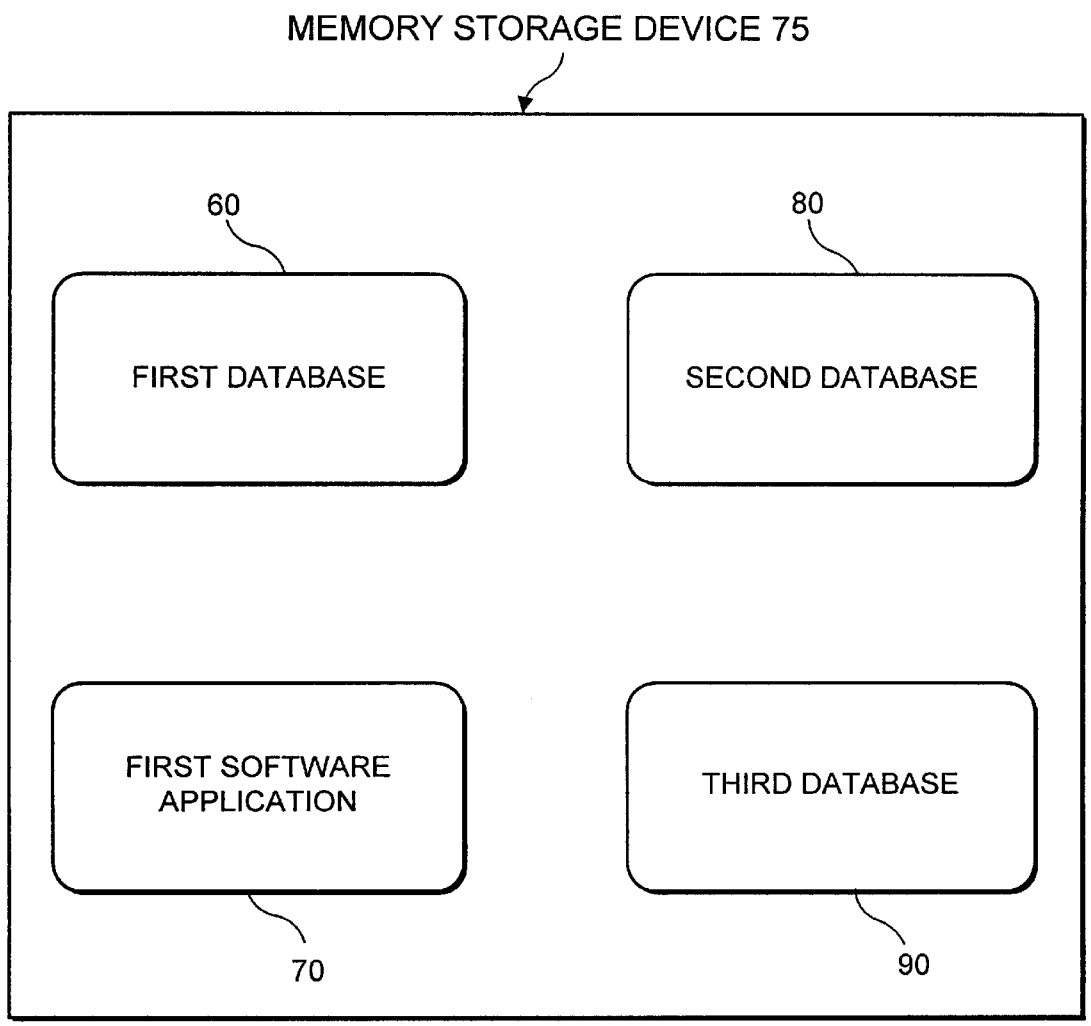
FIG. 2a shows an exemplary embodiment of a storage memory device of a server arrangement according to the present invention.

The server arrangement 10 (among other elements) may be a server or a computing device which includes a memory storage device 75. FIG. 2*a* depicts an exemplary embodiment of the memory storage device 75 of the server arrangement 10. The memory storage device 75 may store a plurality of databases, e.g., a first database 60, a second database 80 and a third database 90. Also, the memory storage device 75 may store a first software application 70 which determines the order in which the data packets are utilized by the user.

Figure 2B:
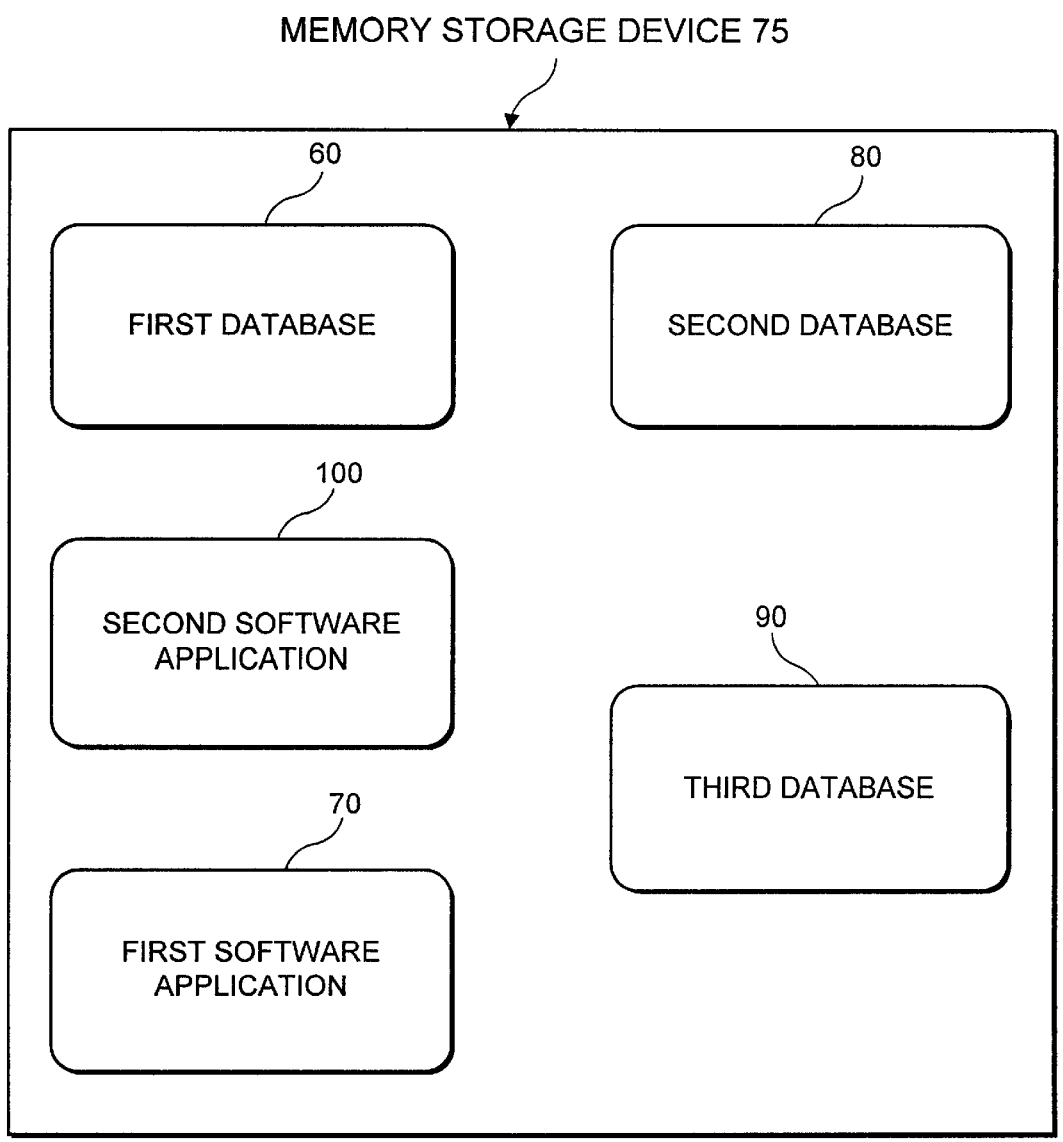
FIG. 2b shows another exemplary embodiment of the storage memory device.

The first database 60 collects and stores the data packets. For example, the first database 60 may store audio, video, advertisement, informative materials, etc. The informative materials may be associated with the audio, the video and/or the advertisement. The informative materials may be information about a particular audio, such as a title, an artist, author of lyrics, an album name, purchasing information, etc. The informative materials may be accessed when the audio is played or at any time before or after. The informative and advertisement materials may be a form of text, audio, video, etc. The second database 80 may store user data, e.g., user identification, address, credit card information, etc. The third database 90 may store user preference data, e.g., the type of music that the user prefers, how many times the user listens to a particular song, the rating given by user to the particular song, etc. FIG. 2*b* shows another exemplary embodiment of the memory storage device 75 which includes a second software application 100 which facilitates a purchase of a particular data packet by the user.

Figure 3:
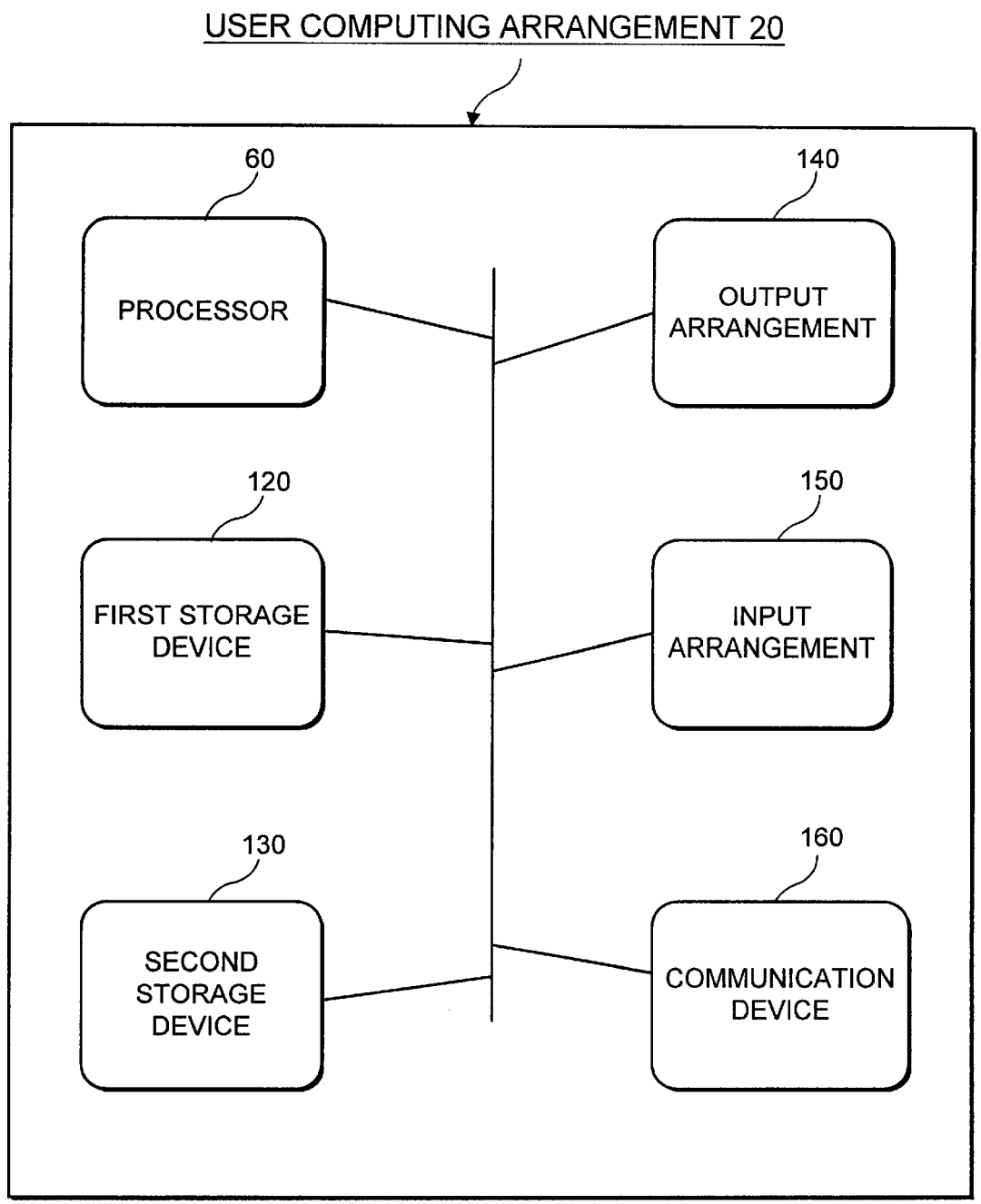
FIG. 3 shows an exemplary embodiment of a user computing arrangement according to the present invention.

FIG. 3 depicts an exemplary embodiment of the UCA 20 which may be a computer, a "dumb terminal", or any other stand-alone microprocessor based device. The UCA 20 may include a processor 110, a first storage device 120 (e.g., RAM), a second storage device 130 (e.g., a hard drive), an output arrangement 140, an input arrangement 150 and a communication device 160. The output arrangement 140 may include a monitor, audio speakers, a printer, a disk drive, etc. The input arrangement 150 may include a keyboard, a mouse, a touch screen, a voice-recognition device, a disk drive, etc. The input arrangement 150 and/or the output arrangement 140 may be physically connected to the UCA 20 or may be wirelessly connected (e.g., via an infrared connection). The communication device 160 may be a modem (e.g., a phone modem, a cable modem, a wireless modem, etc.) or any other communication device capable of modulating and demodulating signals. The second storage device 130 may store databases and software applications which may allow the user to store and/or utilize the data packets. The data packets may be categorized based on a plurality of parameters. The first storage device 120 may temporarily store the data packets (e.g., when they are received or when the data packets are being utilized).

Figure 4B:
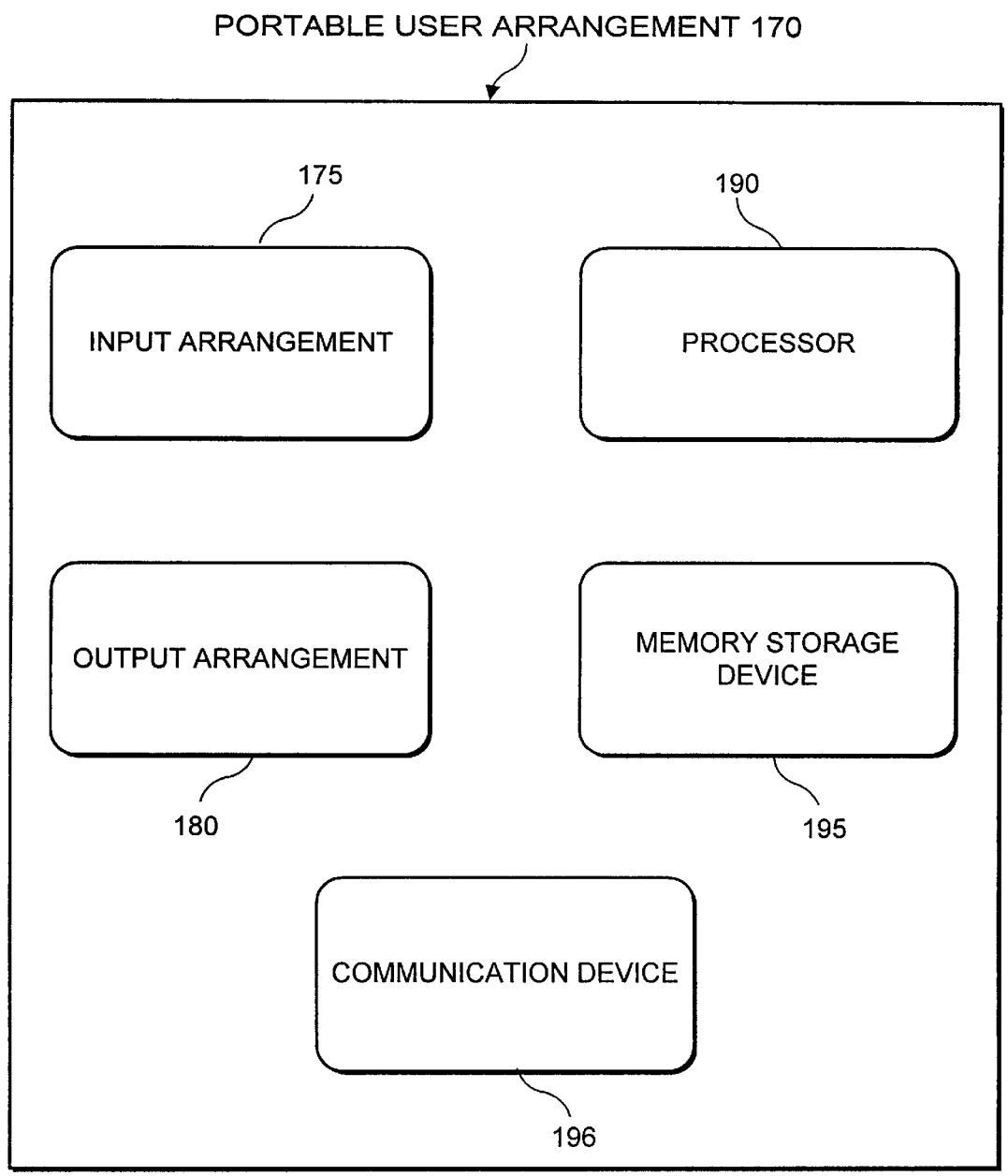
FIG. 4b shows an exemplary embodiment of the portable user arrangement according to the present invention.

FIGS. 4*a* and 4*b* shows the UCA 20 in communication with a portable user arrangement 170 (PUA). The PUA 170 may be physically connected to the UCA 20 or may wirelessly interface with the UCA 20. The PUA 170 is capable of performing functions which are similar to the functions of the UCA 20 as they relate to the present invention. FIG. 4*b* depicts an exemplary embodiment of the PUA 170. The PUA 170 may include an input arrangement 175, an output arrangement 180, a processor 190, a storage device 195 and a communication device 196. The storage device 195 stores the data packets and a software application which allows review of the data packets. The output arrangement 180 may be a portable monitor, portable audio speakers, a portable printer, a portable disk drive, etc. The input arrangement 175 may include a keyboard, a mouse, a touch screen, etc. The communication device 196 may provide a connection to the network 50 and/or to the UCA 20.

Figure 5:
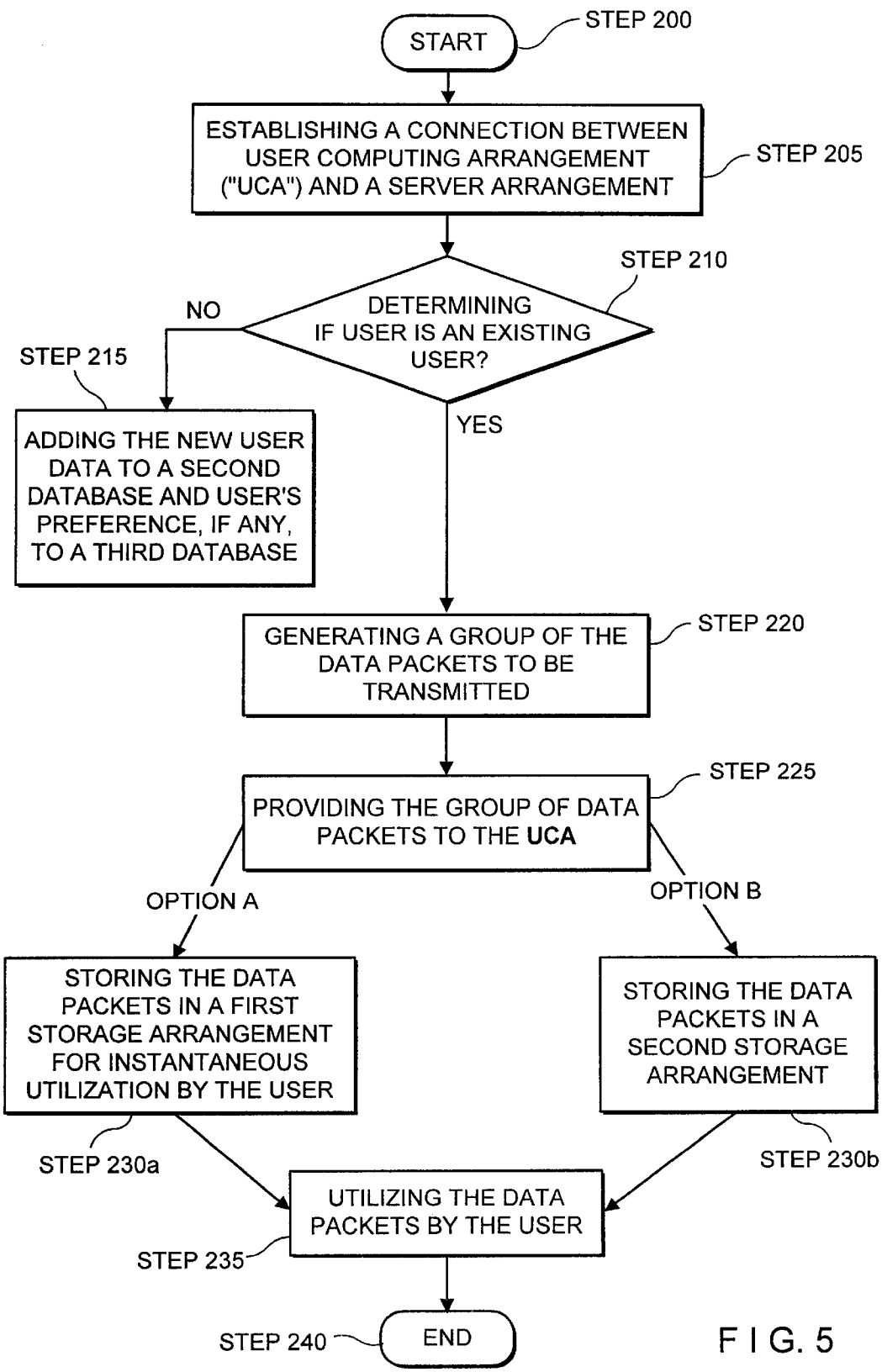
FIG. 5 shows an exemplary embodiment of a method according to the present invention.

FIG. 5 shows an exemplary embodiment of the method according to the present invention. In Step 205, a connection is established between the server arrangement 10 and the UCA 20, e.g., via the network 50. The server arrangement 10 may be connected to the UCA 20 continuously or periodically.

After the connection is established, the server arrangement 10 determines, by verifying the second database 80, whether the user is an existing user or a new user (Step 210). If the user is a new user (i.e., the user's identification is not found in the second database 80), the server arrangement 10 adds the user information to the second database 80 and adds user's preferences to the third database 90 (Step 215).

In Step 220, the server arrangement 10 generates a predetermined group of data packets to be transmitted to the UCA 20. The data packets are encrypted so that the user cannot exercise control over the data packets. The data packets can be utilized, in a limited manner, by the user only after they are decoded by the software application stored in the UCA 20. The group of the data packets may be generated based on user's preferences stored in the third database 90 for transmission to a particular user. Alternatively, a group of data packets may be generated to be transmitted (e.g., broadcasted) to a group of users (e.g., classic music listeners).

Figure 6:
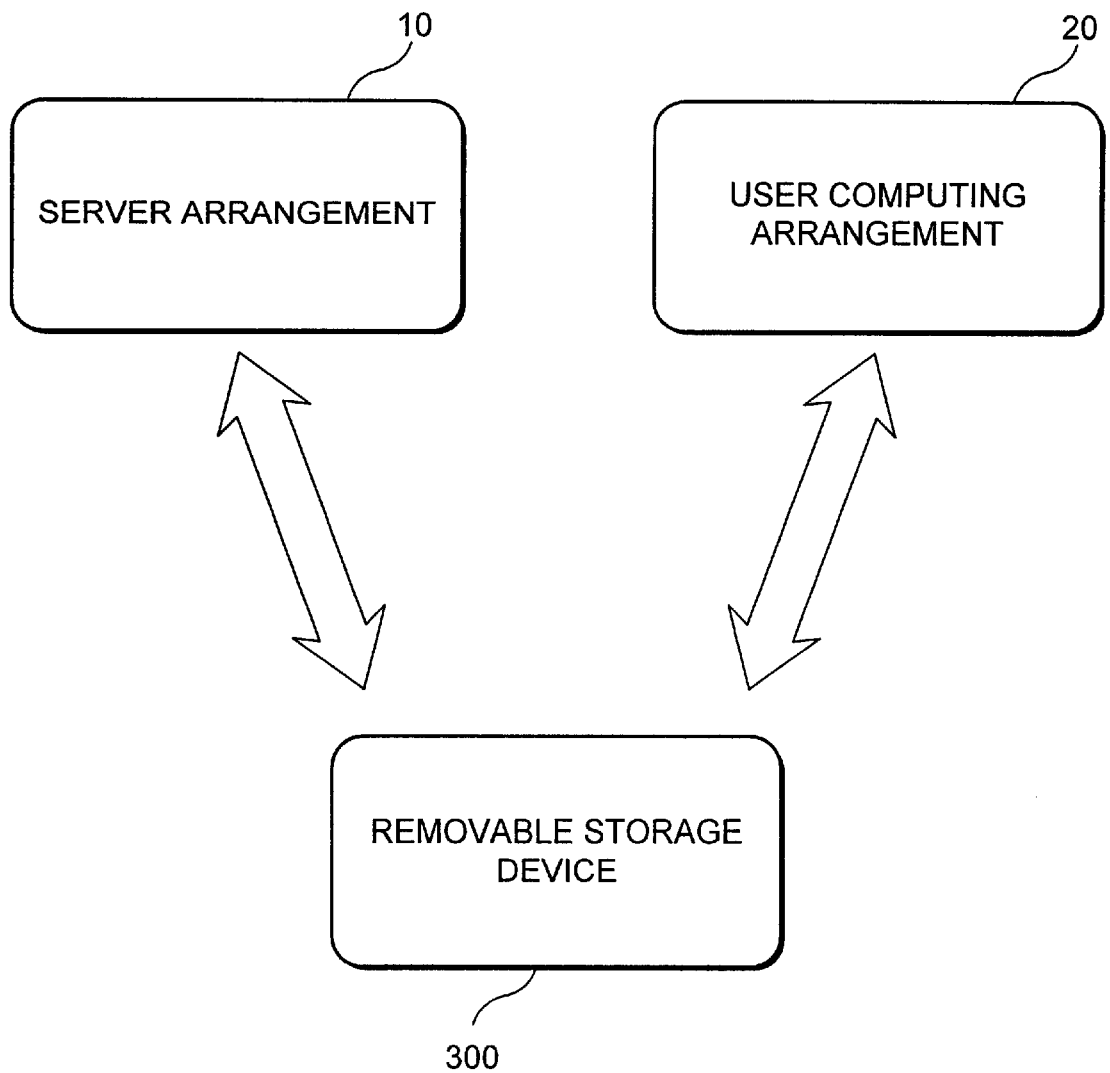
FIG. 6 shows an exemplary embodiment of the system utilizing a removable storage device according to the present invention.

The server arrangement 10 provides the data packets to the UCA 20. (Step 225) The data packets are transmitted to the UCA 20 via a direct transmission using the network 50. Alternatively, the transmission of the data packets may be indirect, e.g., via mail (e.g., the Post Office) using the RSD (as shown in FIG. 6 and described below).

Once the group of data packets is received by the UCA 20, the user may have the following options. The data packets may be stored in the first storage device 120 and instantaneously utilized by the user on a "one data packet at a time" basis (Step 230*a*—Option A). For example, as the audio is being received from the server arrangement 10 by the UCA 20, it is being played to the user. Alternately, or in addition, the data packets may be stored in the second storage device 130 of the UCA 20. The software application, which is stored in the UCA 20, and/or the first software application 70 of the server application 10 may determine the order in which the data packets are utilized by the user (Step 230*b*—Option B).

The user may then utilize the materials of each data packet on an individual basis by accessing the stored data packets in the predefined order (Step 235). The predefined order may be set by the server arrangement 10 and/or the UCA 20. For example, the predefined order may be the following: a first song, a second song, an advertisement, a fourth song, etc.

The user utilizes the data packets via the output arrangement 140. While utilizing the materials of a particular data packet, the user may utilize the entire data packet, and/or may elect to skip the current data packet and continue with the following data packet. In alternative exemplary embodiment according to the present invention, the user may skip a portion of the data packet (e.g., by skipping some of the subpackets of the corresponding data packet). For example, the user may skip 15 seconds of a song. Once the user elects to skip a particular data packet, the user cannot immediately return to the skipped data packet or the skipped subpackets (although, the skipped data packet may be chosen, by the server arrangement 10 and/or the UCA 20, to be played again at a later time).

During the utilization of the data packets, the software application may create a review database on the second storage device 130. The review database may include a list of the reviewed data packets. The user may access these reviewed data packets and review only a short portion of the reviewed data packet (e.g., first ten subpackets. This limited review feature allows the user to revisit the content of the reviewed data packet (e.g., to verify the data packet before purchasing).

The system and method of the present invention may also include a rating system associated with each data packet. The first software application 70 creates a rating for each data packet and stores the rating information in a rating database stored on the second storage device 130. The rating of a particular data packet may take place, e.g., when the user is utilizing the particular data packet. For example, if the user skips over a particular data packet or if the user utilizes an entire data packet, the software application adjusts the rating of that data packet according to a predetermined criteria. The user may also directly rate the data packet during or after utilizing it with a rating procedure. The rating procedure may be a simple procedure, such as a "thumbs up" or "thumbs down" rating, or a more complicated procedure, such as a sliding scale rating from, e.g., 1 to 99.

The server arrangement 10 may also be provided with the rating database of the UCA 20. The server arrangement 10 stores the rating information for each user in the third database 90. The server arrangement 10 may use the rating information, e.g., to determine a future grouping of the data packets that may be transmitted to that user and/or to a plurality of users with similar preferences. The server arrangement 10 may also utilize the rating information to determine when to remove a particular data packet from a group of the data packets. Once the data packet achieves a rating which is below a predetermined value, the server arrangement 10 may delete that data packet from the group of the data packets and insert another data packet in its place.

The user may elect to purchase any data packet for an unlimited use. The purchasing process includes decoding the data packet, storing it in the second storage device 130 and receiving payment from the user for this data. There are a number of ways for the payment to be effectuated. For example, the user may have a prepayment option. In such a case, the software application decodes the data packets and provides them to the user, as long as there is a positive prepaid balance.

The user may also use a "pay-as-you-buy" option. Using this option, the user buys the data packet and pays for it one at the time. For example, when the user elects to purchase a data packet, the software application marks the data packet for the purchase in the review database. The server arrangement 10 receives a purchase mark indication instantaneously, if the UCA 20 is connected to the server arrangement 10. However, if the UCA 20 is not connected, the data packet remains marked for the purchase and the server arrangement 10 receives the mark indication upon the subsequent connection to the UCA 20. Once the server arrangement 10 receives the purchase mark, it signals to decode the data packet and provided the data packet to the user. The user may then access the purchased data packets for an unlimited use and for a complete control, thus allowing the user to replay, rewind, and pause the purchased data packet at will.

While utilizing a particular data packet, the user may also request the informative material associated with the particular data packet. For example, while listening to the audio, the user may request the video clip of the audio or the information about the audio, etc.

As described above, the predefined order of the data packets may be set by utilizing the server arrangement 10 and/or the UCA 20. For example, the server arrangement 10 set the order of the data packets which are utilized as soon as they are received by the first storage arrangement 120. In such case, the server arrangement 10 completely controls the order and the UCA 20 has no control over the order. The user can skip the currently utilized data packet.

In alternative embodiment of the present invention, the server arrangement 10 provides the data packets to the UCA 20. The server arrangement 20 does not set the order of the data packets. Instead, the order is set locally by the UCA 20 after the data packets are stored in the second storage device 130.

Yet, in another embodiment of the present invention, the order may be set by both the server arrangement 10 and the UCA 20. For example, the server arrangement 10 sets rules defining which data packets to be provided to the user (e.g., provide 40% rock and 60% classic; after every third song, an advertisement must be inserted). Once the data packets are stored in the second storage device 130, the order of the data packets is set by the software application of the UCA 20 based on the rules set by the server arrangement 10.

Another embodiment of the system 1 described above includes the PUA 170 as described above and shown in FIGS. 4a and 4b. The PUA 170, which functions in a similar manner as the UCA 20, allows the user to have a portable access to the data packets. The PUA 170 may allow the user to review the data packets anywhere, and at any time. For example, the PUA 170 may be connected to a music system of a mobile vehicle.

FIG. 6 depicts a system 1', which is similar to the system 1 described above. In the system 1', the data packets and other data (e.g., the rating information, etc.) are not transmitted between the server arrangement 10 and the UCA 20 via the network 50. Instead, the transmissions are performed via mail using a removable storage device ("RSD") 300.

The RSD 300 may be transmitted to and from the user via a mail, such as U.S. Postal Service. The RSD 300 may be a compact disc, a digital versatile (or video) disc, a zip disk, an optical disk, etc. The RSD 300 may store a plurality of predetermined data packets and/or databases. The stored data packets, which are encrypted, are provided to the user.

In addition, the system 1' may be utilized to register a new user. The user may provide his/her information to establish an account with the server arrangement 10. Such information may be provided via mail using the RSD 300. If the user decides to buy a particular data packet, the transaction may be cleared with the server arrangement 10. Once the user provides purchasing information (i.e., an identification of the particular data packet, purchasing information such as credit card or checking account), the server arrangement 10 may issue a permission indication to complete the purchase of the particular data packet, and such permission may be transmitted using the RSD 300.

Although the system 1 is capable of utilizing the data packets as soon as they are received by the first storage device 120, in the preferred embodiment of the present invention, the data packets are first stored in the second storage device 130 and then utilized. The advantage of the preferred embodiment is that it allows to improve a quality of utilization of the data packets. For example, when subpackets of a particular data packet are transmitted over the network 50, they may be received by the UCA 20 at different times. If the particular data packet is utilized as soon as it is received by the UCA 20 and if one of its subpackets is not yet received by the UCA 20, then the quality of utilization would diminish (e.g., drop in audio play). Such problem is avoided by receiving and storing all subpackets of the particular data packets and then utilizing them. In addition, if the data packet is stored in the second storage device 130, then it may be utilized more than once because the second storage device 130 may be, e.g., a hard drive, while the first storage device 120 may be, e.g., RAM.

In alternative exemplary embodiment of the present invention, only a portion of a particular data packet is provided by the server arrangement 10 to the UCA 20. For example, 90% of subpackets of the particular data packet are provided to the UCA 20 in advance. However, the particular data packet cannot be utilized until remaining 10% of subpackets are received by the UCA 20. The remaining subpackets may be provided at a predetermined time (e.g., right before the particular data packet is executed). This feature may serve, e.g., as a security feature to prevent an unauthorized utilization of the particular data packet. Also, after the particular data packet is utilized, it is sufficient to remove a few subpackets to prevent any further utilization of the particular data packet. Consequently, such feature allows to keep most of the particular data packet at the UCA 20 and allows to quickly utilized the particular data packet by providing the few missing subpackets in an expedited manner.

Several embodiments of the present invention are specifically illustrated and/or described herein. However, it will be appreciated that modifications and variations of the present invention are covered by the above teachings and within the purview of the appended claims without departing from the spirit and intended scope of the present invention.

What is claimed is:

1. A method, comprising the steps of:
   providing data packets from a server arrangement to a user computing arrangement;
   determining, using at least one of the server and the user computing arrangement, rules governing utilization of the data packets by the user computing arrangement and preventing a user from altering the rules;
   storing the data packets on a storage device of the user computing arrangement; and
   with the user computing arrangement, executing a set of instructions which utilize the data packets in a predetermined order in accord with the rules, wherein the user of the user computing arrangement is prevented from modifying the predetermined order.

2. The method according to claim 1, further comprising the steps of:
   establishing a connection between the user computing arrangement and the server arrangement using a communication network; and
   transmitting the data packets from the server arrangement to the user computing arrangement via the network.

3. The method according to claim 1, further comprising the steps of:
   storing the data packets on a removable storage device;
   providing the removable storage device to the user; and
   transferring the data packets from the removable storage device to the storage device of the user computing arrangement.

4. The method according to claim 1, wherein the providing step includes the substep of encrypting the data packets, and wherein the executing step includes the substep of decrypting the data packets.

5. The method according to claim 1, further comprising the steps of:
   receiving a request from the user to purchase at least one packet of the data packets;
   obtaining payment from the user for the at least one packet;
   decrypting the at least one packet; and
   providing the at least one packet to the user, wherein the user has an unlimited control over the at least one packet.

6. The method according to claim 1, further comprising the steps of:
   compiling a list of the utilized data packets; and
   storing the list on the storage device.

7. The method according to claim 6, further comprising the steps of:
   providing a limited access to the utilized data packets; and
   enabling the user to purchase at least one packet of the utilized data packets.

8. The method according to claim 7, wherein each of the data packets includes a plurality of subpackets, and wherein, during the limited access, a predetermined number of the plurality of subpackets are utilized.

9. The method according to claim 1, further comprising the steps of:
   rating the data packets to generate rating data; and
   storing the rating data in a rating database which is provided in the storage device.

10. The method according to claim 9, further comprising the step of:
    providing the rating data to the server arrangement.

11. The method according to claim 9, further comprising the step of:
    generating the rating data as a function of a rating provided by the user.

12. The method according to claim 9, further comprising the step of:
    generating the rating data as a function of actions of the user during or after a utilization of the data packets.

13. The method according to claim 9, further comprising the step of:
    determining an affinity matching between a plurality of users using the rating data.

14. The method according to claim 9, further comprising the step of:
    selecting the data packets to be provided by the server arrangement as a function of the rating data.

15. The method according to claim 1, further comprising the step of:
    enabling the user to skip a currently utilized data packet of the data packets.

16. The method according to claim 1, wherein each of the data packets includes at least one of an audio, a video, text, an advertisement material and an informative material.

17. The method according to claim 16, further comprising the step of:
    providing the informative material to the user, the informative material being associated with a data packet of the data packets which is being utilized.

18. The method according to claim 16, further comprising the step of:
    inserting at least one data packet including advertisement material between predetermined ones of the data packets representing one of audio video, text and a informative material based on the rules.

19. The method according to claim 1, wherein each of the data packets includes a plurality of subpackets, wherein the storage device includes a random access memory, and the method further comprising the step of:

utilizing the particular data packet as soon as the plurality of subpackets are stored in the random access memory.

20. The method according to claim 1, further comprising the step of:

preventing the user from replaying the currently utilized data packet.

21. A method, comprising the steps of:

providing data packets from a server arrangement to a user computing arrangement;

determining, using at least one of the server and the user computing arrangement, rules governing utilization of the data packets by the user computing arrangement and preventing a user from altering the rules;

with the user computing arrangement, executing a set of instructions which utilize each of the data packets in a predetermined order in accord with the rules, wherein the user of the user computing arrangement is prevented from changing the predetermined order; and allowing the user of the user computing arrangement to skip from a first one of the data packets only to a second one of the data packets which immediately follows the first data packet in the predetermined order.

22. The method according to claim 21, wherein the rules prevent the user from copying any of the data packets.

23. The method according to claim 21, wherein the rules prevent the user from selecting a desired data packet for utilization on demand.

24. The method according to claim 21, wherein the rules permit the user to access only selected ones of the data packets on demand and prevent the user from accessing others of the data packets on demand.

25. The method according to claim 21, wherein the rules permit a user to skip past selected ones of the data packets to access subsequent data packets in the predetermined order.

26. A method, comprising the steps of:

providing data packets from a server arrangement to a user computing arrangement;

storing the data packets on a storage device of the user computing arrangement;

determining, using the server arrangement, rules governing utilization of the data packets by the user computing arrangement and preventing a user from altering the rules;

with the user computing arrangement, arranging the data packets in a predetermined order in accord with the rules; and with the user computing arrangement, executing a set of instructions which utilize the data packets in the predetermined order, wherein the user of the user computing arrangement is prevented from modifying the predetermined order.

27. A method, comprising the steps of:

(a) providing a plurality of data packets from a server arrangement to a user computing arrangement, each of the data packets including a plurality of subpackets;

(b) storing a first one of the subpackets for a first one of the data packets on a storage device of the user computing arrangement;

(c) arranging the data packets in a predetermined order using at least one of the server arrangement and the user computing arrangement;

(d) determining, using at least one of the server and the user computing arrangement, rules governing utilization of the data packets by the user computing arrangement and preventing a user from altering the rules;

(e) after steps (a) and (b), providing a second one of the subpackets from the first data packet from the server arrangement to the user computing arrangement;

(f) after step (e), storing the second subpacket on the storage device; and (g) with the user computing arrangement, executing a set of instructions which utilize the data packets in the predetermined order in accord with the rules, wherein the user of the user computing arrangement is prevented from modifying the predetermined order.

28. The methods according to claim 27, further comprising the step of:

(g) after the step (f), removing the second subpacket from the storage arrangement.

29. A system, comprising:

a server arrangement transmitting data packets, each of the data packets including first and second subpackets, the server arrangement transmitting the first subpacket of each data packet before the second subpacket thereof; and a user computing arrangement receiving and storing the first subpacket of each data packet before the second subpacket thereof, at least one of the server arrangement and the user computing arrangement determining rules governing utilization of the data packets by the user computing arrangement and preventing a user from altering the rules, wherein the user computing arrangement executes a set of instructions which utilize the data packets in a predetermined order in accord with the rules, and wherein the user of the user computing arrangement is prevented from modifying the predetermined order.

30. A system, comprising:

a server arrangement providing data packets; and a user computing arrangement receiving and temporarily storing the data packets, at the least one of the server arrangement and the user computing arrangement determining rules governing utilization of the data packets by the user computing arrangement and preventing a user from altering the rules, wherein the user computing arrangement executes a set of instructions which utilize the data packets in a predetermined order in accord with the rules, and wherein the user of the user commuting arrangement is prevented from modifying the predetermined order, the user being allowed to skip a currently utilized one of the data packets.

31. A system, comprising:

a server arrangement providing data packets; and a user computing arrangement receiving and temporarily storing the data packets, at the least one of the server arrangement and the user computing arrangement determining rules governing utilization of the data packets by the user computing arrangement and preventing a user from altering the rules, wherein the user computing arrangement executes a set of instructions which utilize the data packets in a predetermined order in accord with the rules, wherein the predetermined order is determined as a function of the rules and a rating database, and wherein the user of the user computing arrangement is prevented from modifying the predetermined order, the user rating the data packets to generate the rating database.

32. A user computing arrangement, comprising:

an input arrangement receiving data packets which are provided by a server arrangement;

a storage device storing the data packets; and a processor executing a set of instructions which utilize the data packets in a predetermined order, wherein at least one of the server arrangement and the user computing arrangement determines rules governing utilization of the data packets and prevents a user from altering the rules, the predetermined order being set in accord with the rules, and wherein the user is prevented from modifying the predetermined order.

33. A computer-readable storage medium storing a set of instructions executable by a processor, the set of instructions performing the steps of:

providing data packets from a server arrangement to a user computing arrangement;

determining, using at least one of the server and the user computing arrangement, rules governing utilization of the data packets by the user computing arrangement and preventing a user from altering the rules;

storing the data packets on a storage device of the user computing arrangement; and with the user computing arrangement, executing a set of instructions which utilize the data packets in a predetermined order in accord with the rules, wherein the user of the user computing arrangement is prevented from modifying the predetermined order.

34. A computer data signal embodied in a carrier wave, the computer data signal comprising:

(a) a first source code segment providing data packets from a server arrangement to a user computing arrangement;

(b) a second source code segment determining rules governing utilization of the data packets by the user computing arrangement and preventing a user from altering the rules;

(c) a third source code segment storing data packets on a storage device of the user computing arrangement; and (d) a fourth source code segment executing a set of instructions permit the user computing arrangement to utilize the data packets in the predetermined order determined in accord with the rules, wherein the user of the user computing arrangement is prevented from modifying the predetermined order.

35. A method for playing digitized data, comprising:

transmitting a control command from a main computer to a remote computer, the remote computer storing the data which include elements arranged for playing in a predetermined order;

receiving over a network by the main computer a subset of the elements, the subset of the elements being transmitted by the remote computer sequentially in the predetermined order, the subset of the elements including all of the elements except at least one of the elements, the at least one of the elements being excepted by the remote computer as a function of the control command;

storing the received subset of elements in a memory device at the main computer; and with the main computer, playing the subset of elements.

36. The method according to claim 35, wherein the control command is a skip command.

37. The method according to claim 35, wherein the storing step includes temporarily buffering the received subset of elements in a cache memory device.

38. The method according to claim 35, wherein each of the elements include at least one of audio, video, text, an advertisement material and an informative material.

39. A method for playing digitized audio data, comprising:

transmitting a control command from a user at a main computer to a remote computer, the remote computer storing the data, the data including elements arranged for playing in a predetermined order;

sequentially transmitting, in the predetermined order by the remote computer to the main computer, all of the elements except at least one of the elements, the at least one of the elements being selected as a function of the control command;

receiving over a network by the main computer the transmitted elements; and playing by the main computer the received elements.

40. A method for playing digitized audio data, comprising:

transmitting a control command from a main computer to a remote computer, the remote computer storing the data, the data including elements arranged for playing in a predetermined order;

receiving over a network by the main computer a subset of the elements, the subset of the elements being transmitted by the remote computer sequentially in the predetermined order, the subset of the elements including all of the elements except at least one of the elements, the at least one of the elements being excepted by the remote computer as a function of the control command;

storing the received subset of elements in a memory device at the main computer; and with the main computer, playing the subset of elements.

41. The method according to claim 40, wherein the control command is a skip command.

42. The method according to claim 40, wherein the storing step includes temporarily buffering the received subset of elements in a cache memory device.

43. A method for playing digitized audio data, comprising:

transmitting a control command from a user at a main computer to a remote computer, the remote computer storing data, the data including elements arranged for playing in a predetermined order;

sequentially transmitting, in the predetermined order, by the remote computer to the main computer, all of the elements except at least one of the elements, the at least one of the elements being selected as a function of the control command;

receiving over a network by the main computer the transmitted elements; and playing by the main computer the received elements.

* * * * *